US012644534B2

(12) United States Patent
Ramprashad et al.

(10) Patent No.: US 12,644,534 B2
(45) Date of Patent: Jun. 2, 2026

(54) RATE MATCHING HYDRAULIC ACTUATORS ON COMMON CONTROL MANIFOLD

(71) Applicant: Hamilton Sundstrand Corporation, Charlotte, NC (US)

(72) Inventors: Sachin Ramprashad, West Hartford, CT (US); Eric Briggs, Indian Trail, NC (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 185 days.

(21) Appl. No.: 18/419,961

(22) Filed: Jan. 23, 2024

(65) Prior Publication Data

US 2025/0237321 A1     Jul. 24, 2025

(51) Int. Cl.
*F16K 31/122*          (2006.01)

(52) U.S. Cl.
CPC ............................... *F16K 31/1225* (2013.01)

(58) Field of Classification Search
CPC ......... F15B 11/042; F15B 11/22; F15B 11/16;
F15B 13/0402; F15B 2211/41545; F15B
2211/428; F15B 2211/455; F15B 2211/46;
F15B 2211/7128; F15B 2211/75; F15B
2211/782; F16K 31/1225; F16K 31/1226;
F16K 31/1221; F16K 3/262; F16K
11/0716
See application file for complete search history.

(56) References Cited

U.S. PATENT DOCUMENTS

| | | | | |
|---|---|---|---|---|
| 4,391,409 | A | | 7/1983 | Scholz |
| 4,485,725 | A | * | 12/1984 | Tootle ..................... F15B 11/22 |
| | | | | 92/33 |
| 4,825,748 | A | * | 5/1989 | Sheng ..................... F15B 11/22 |
| | | | | 91/530 |
| 8,677,885 | B2 | | 3/2014 | Lauffer et al. |
| 10,570,936 | B2 | | 2/2020 | Hussey |
| 2013/0277584 | A1 | * | 10/2013 | McKernan ................ B66F 9/22 |
| | | | | 251/129.01 |

FOREIGN PATENT DOCUMENTS

| | | | | |
|---|---|---|---|---|
| DE | 102021202902 | A1 | * | 9/2021 ............. F15B 11/22 |
| EP | 3462013 | B1 | * | 12/2020 ............... F02K 1/15 |

OTHER PUBLICATIONS

EP-3462013-B1—Machine Translation (Year: 2020).*
DE-102021202902-A1—Machine Translation (Year: 2021).*
European Search Report for Application No. 25153173.7, mailed Jun. 30, 2025, 13 pages.

* cited by examiner

*Primary Examiner* — Daphne M Barry
(74) *Attorney, Agent, or Firm* — CANTOR COLBURN LLP

(57)          ABSTRACT
An actuation assembly includes a control valve, a first actuator and a second actuator fluidly connected to the control valve via plumbing. The first actuator has a first extend port and the second actuator having a second extend port. A flow control device fluidly connected to the first actuator and the second actuator is operable to balance a flow rate of a fluid at the first actuator with the flow rate of the fluid at the second actuator. The flow control device is arranged within the plumbing, at a position between the control valve and the first extend port and the second extend port.

18 Claims, 5 Drawing Sheets

RATE MATCHING HYDRAULIC ACTUATORS ON COMMON CONTROL MANIFOLD

BACKGROUND

Embodiments of the present disclosure relate to a gas turbine engine, and more particularly, to an actuation system associated with a control surface of a gas turbine engine.

Engine control surfaces, such as variable area exit nozzles and thrust reversers, on gas turbine engines utilize multi-actuation systems that move and translate the parts of the engine effectors in a synchronized manner. Typically, a multi-actuation system on a gas turbine engine is configured with one electrohydraulic servo valve (EHSV) that provides hydraulic flow to all of the actuators of the multi-actuation system. A multi-actuation system with a single EHSV requires tight kinematics to maintain accuracy of the actuators since there is no mechanism between the actuators to keep the actuators synchronized to each other. If one of the actuators experiences more force resistance than the other actuators, that actuator may fall out of synchronization with the other actuators and introduce error into the multi-actuation system. Error between actuators in the multi-actuation system can cause the connected control surface to skew and reduce overall engine efficiency or result in decreased performance.

BRIEF DESCRIPTION

According to an embodiment, an actuation assembly includes a control valve, a first actuator and a second actuator fluidly connected to the control valve via plumbing. The first actuator has a first extend port and the second actuator having a second extend port. A flow control device fluidly connected to the first actuator and the second actuator is operable to balance a flow rate of a fluid at the first actuator with the flow rate of the fluid at the second actuator. The flow control device is arranged within the plumbing, at a position between the control valve and the first extend port and the second extend port.

In addition to one or more of the features described above, or as an alternative to any of the foregoing embodiments the first actuator includes a first retract port and the second actuator includes a second retract port. Both the first retract port and the second retract port are fluidly connected to the control valve.

In addition to one or more of the features described above, or as an alternative to any of the foregoing embodiments all fluid from the control valve is provided to both the first actuator and the second actuator through the flow control device.

In addition to one or more of the features described above, or as an alternative to any of the foregoing embodiments the flow control device includes a housing having an inlet, a first outlet, a second outlet, and a hollow interior. The inlet is connectable to the plumbing, the first outlet is connectable to the first extend port, and the second outlet is connectable to the second extend port. A valve body is arranged within the hollow interior. The valve body is movable within the hollow interior in response to a pressure within the housing associated with the first actuator and the second actuator.

In addition to one or more of the features described above, or as an alternative to any of the foregoing embodiments the flow control device further comprises at least one biasing member operable to bias the valve body to a neutral position.

In addition to one or more of the features described above, or as an alternative to any of the foregoing embodiments the flow control device includes a first compartment formed within the hollow interior between the housing and a first end of the valve body. The first compartment is fluidly connected to the inlet and the first outlet. A second compartment is formed within the hollow interior between the housing and a second end of the valve body. The second compartment is fluidly connected to the inlet and the second outlet.

In addition to one or more of the features described above, or as an alternative to any of the foregoing embodiments a flow path is formed in the valve body, In addition to one or more of the features described above, or as an alternative to any of the foregoing embodiments the flow path connecting the inlet to the first compartment and connecting the inlet to the second compartment.

In addition to one or more of the features described above, or as an alternative to any of the foregoing embodiments the valve body is movable within the housing to adjust the flow rate of the fluid at both the first outlet and the second outlet.

In addition to one or more of the features described above, or as an alternative to any of the foregoing embodiments the first actuator and the second actuator are substantially identical.

In addition to one or more of the features described above, or as an alternative to any of the foregoing embodiments each of the first actuator and the second actuator includes a movable piston.

In addition to one or more of the features described above, or as an alternative to any of the foregoing embodiments the first actuator and the second actuator are part of a gas turbine engine.

In addition to one or more of the features described above, or as an alternative to any of the foregoing embodiments the first actuator and the second actuator are operably coupled to a control surface.

According to an embodiment, a method of balancing a flow rate between a plurality of actuators within an actuation assembly includes providing a fluid at a first flow rate to a first extend port of a first actuator, generating a first pressure within a first compartment of a flow control device based on the first flow rate, providing the fluid at a second flow rate to a second extend port of a second actuator, generating a second pressure within a second compartment of the flow control device based on the second flow rate, and moving a valve body of the flow control device in response to the first pressure and the second pressure to balance the first flow rate and the second flow rate.

In addition to one or more of the features described above, or as an alternative to any of the foregoing embodiments when the first flow rate is less than the second flow rate, moving the valve body includes moving the valve body away from a first outlet fluidly connected to the first actuator and towards a second outlet fluidly connected to the second actuator.

In addition to one or more of the features described above, or as an alternative to any of the foregoing embodiments decreasing a size of the second outlet fluidly connected to the second actuator and increasing the size of the first outlet fluidly connected to the first actuator in response to moving the valve body towards the second outlet.

In addition to one or more of the features described above, or as an alternative to any of the foregoing embodiments increasing the first flow rate and decreasing the second flow rate in response to moving the valve body towards the second outlet.

In addition to one or more of the features described above, or as an alternative to any of the foregoing embodiments the fluid provided at the first flow rate to the first extend port is output from a first outlet of the flow control device and the fluid provided at the second flow rate to the second extend port is output from a second outlet of the flow control device.

In addition to one or more of the features described above, or as an alternative to any of the foregoing embodiments moving the valve body to a neutral position when the first flow rate is equal to the second flow rate.

In addition to one or more of the features described above, or as an alternative to any of the foregoing embodiments biasing the valve body toward a neutral position.

In addition to one or more of the features described above, or as an alternative to any of the foregoing embodiments adjusting a control surface operably coupled to both the first actuator and the second actuator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
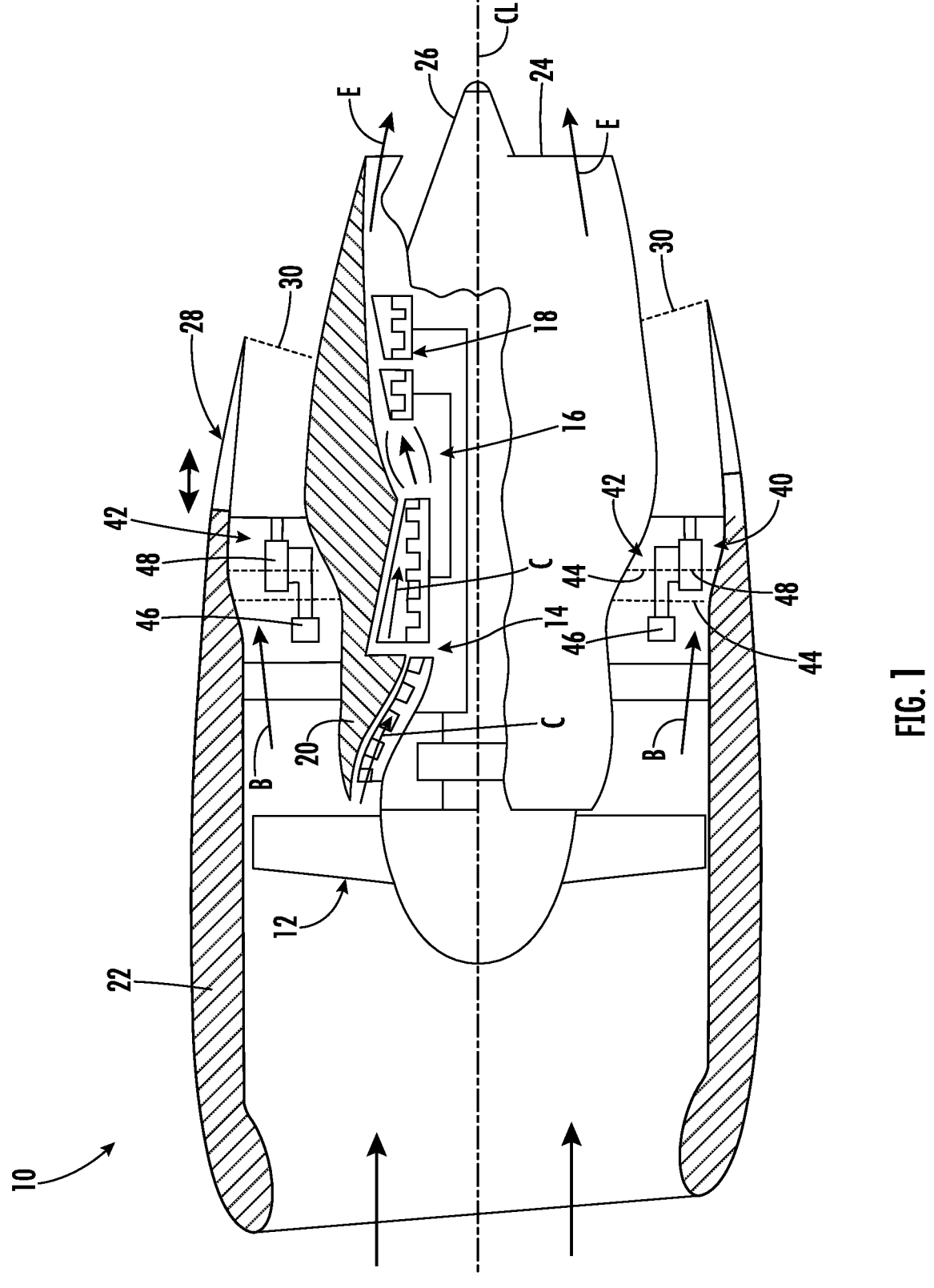
FIG. 1 is a partial cross-sectional view of a gas turbine engine with a multi-actuation system according to an embodiment.

With reference now to FIG. 1 a partial cross-sectional view of an exemplary gas turbine engine 10 is provided. As shown, the gas turbine engine 10 includes a fan section 12, a compressor section 14, a combustor section 16, and a turbine section 18. The compressor section, combustor section 16, and turbine section 18 extend axially along an engine centerline CL and may be housed inside a core nacelle 20. A fan section 22 may at least partially surround the fan section 12 and the core nacelle 20.

During operation of the engine 10, the fan section 12 pulls an airflow into the core nacelle 20 and moves some air along a bypass flow path B. The compressor section 14 draws a portion of the airflow into the core nacelle along a core flow path C, where air is compressed and communicated to the combustor section 16. Within the combustor section 16, air is mixed with fuel and ignited to generate a high-pressure exhaust gas stream that expand through the turbine section. Energy extracted from the mixture within the turbine section is utilized to drive the fan section 12 and the compressor section 14. A core engine exhaust E exits the core nacelle 20 through a core nozzle 24 defined between the core nacelle 20 and a tail cone 26.

Although the disclosed non-limiting embodiment depicts a turbofan gas turbine engine, it should be understood that the concepts described herein are not limited to use with turbofans and may be applied to other types of turbine engines including but not limited to industrial gas turbines, reverse-flow gas turbine engines, turbojet engines and turbine engines including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

In an embodiment, a fan variable area nozzle (VAFN) 28 is connected to an aft end of fan section 22 and defines a fan nozzle exit area 30. The air driven by fan section 12 along bypass flow path B is discharged from engine 10 via VAFN 28 to provide thrust. Thrust is a function of density, velocity, and area. One or more of these parameters can be manipulated by VAFN 28 to vary the amount and direction of thrust provided by the bypass flow B. VAFN 28 operates to effectively vary the area of fan nozzle exit area 30 to selectively adjust the pressure ratio of the bypass flow B.

VAFN 28 varies the fan nozzle exit area via an actuation system 40 including a plurality of actuation assemblies 42 operable to move one or more control surfaces, illustrated at 44 (see FIG. 1), in an axial or radial direction relative to the engine centerline CL. With continued reference to FIG. 1, in an embodiment, the actuation assemblies 42 are circumferentially spaced about the centerline CL, and one or more control surfaces or effectors 44, are operably coupled to corresponding actuation assemblies.

Figure 2:
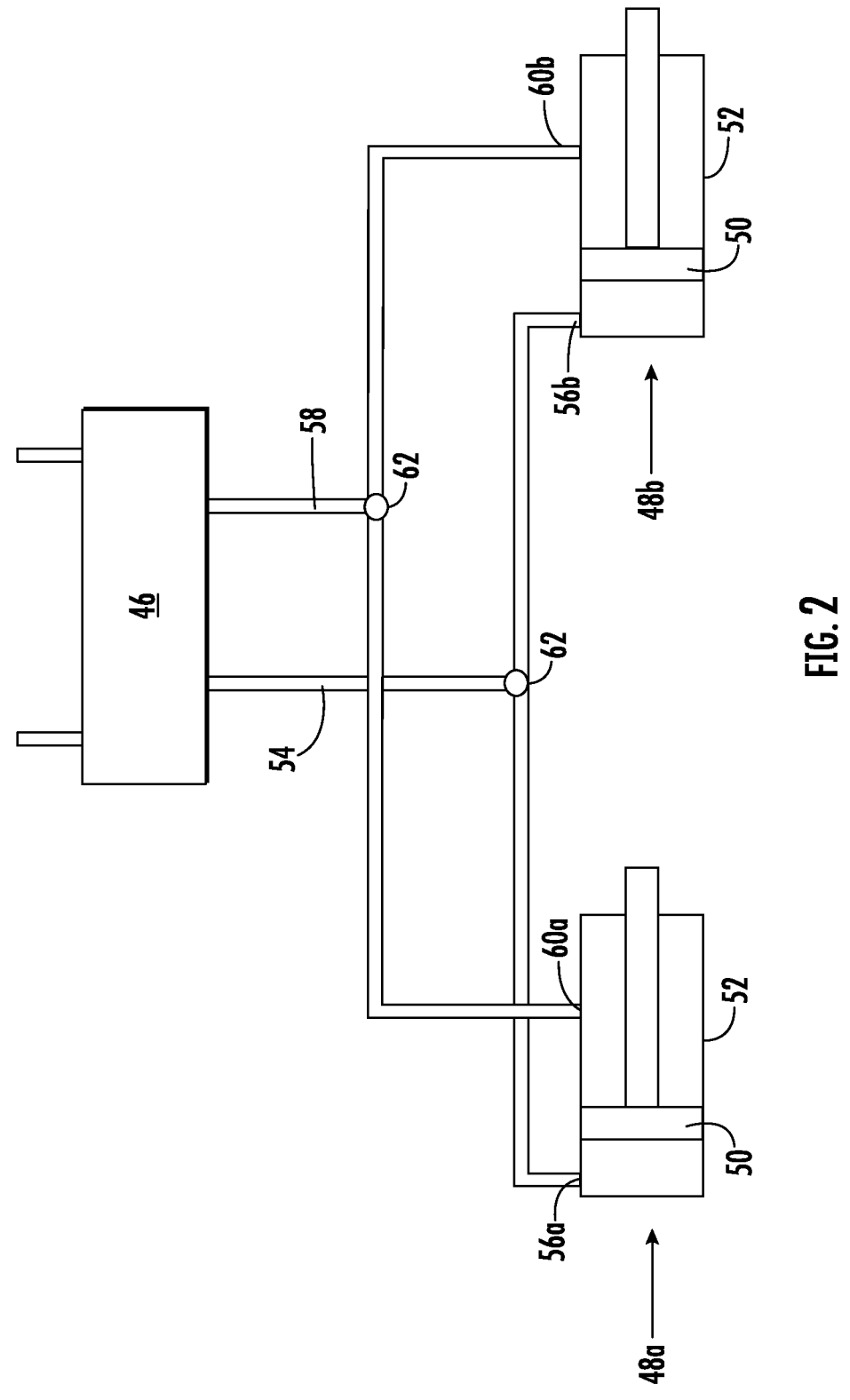
FIG. 2 is a schematic diagram of a multi-actuation system according to an embodiment.
Figure 3:
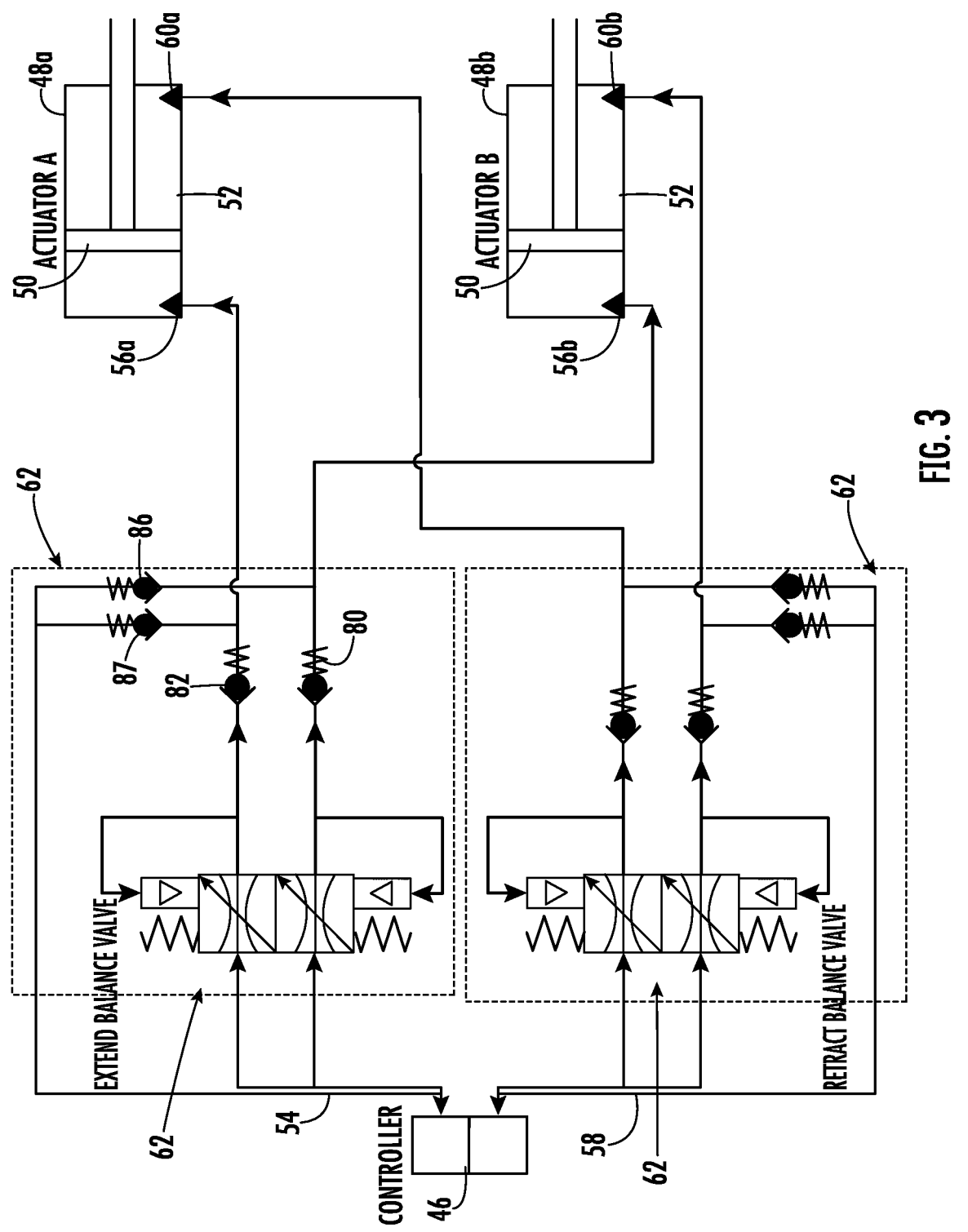
FIG. 3 is a schematic diagram of a multi-actuation system according to an embodiment.

With continued reference to FIG. 1 and further reference to FIG. 2, in an embodiment, an actuation assembly 42 includes a control valve 46, such as an electrohydraulic servo valve for example, fluidly connected to a plurality of actuators 48, such as a first actuator 48a and a second actuator 48b. The control valve 46 is operable to control the actuators 48a. 48b by varying the amount of hydraulic fluid (not shown) within each actuator. The plurality of actuators 48a, 48b may be connected to the same control surface, or alternatively, to different control surfaces. During operation of the gas turbine engine 10, the plurality of actuators 48a, 48b within an actuation assembly 42 are movable in unison to adjust the axial or radial position of the at least one control surface. Further, in some embodiments, the plurality of actuation assemblies 42 may be operated in unison. Although the actuation assemblies 42 are illustrated and described herein with respect to With continued reference to FIG. 2 and further reference to FIG. 3, various examples of an actuation assembly are illustrated in more detail. In the illustrated, non-limiting embodiment, each actuator 48a, 48b includes a piston 50 movable within a housing 52. However, it should be understood that other suitable types of hydraulic actuators are also within the scope of the disclosure. Plumbing 54, such as including one or more conduits or ducts for example, fluidly connects the control valve 46 to a first port 56a of a first actuator 48a and to a first port 56b of a second actuator 48b. In an embodiment, the first ports 56a, 56b are extend ports. Further, the first ports 56a, 56b may be arranged at the same first side of the movable pistons 50, respectively. Additional plumbing 58, such as including one or more conduits or ducts for example, extends between and fluidly connects the control valve 46 and a second port 60a of the first actuator 48a and a second port 60b of the second actuator 48b. In an embodiment, the second ports are retract ports. Although in the illustrated, non-limiting embodiment, the first ports 56a, 56*b* are configured as inlets and the second ports 60*a,* 60*b* are configured as outlets, it should be appreciated that the second ports 60*a,* 60*b* may function as inlets and the first ports 56*a,* 56*b* may function as outlets depending on the direction of flow within the actuation assembly 42.

Figure 4:
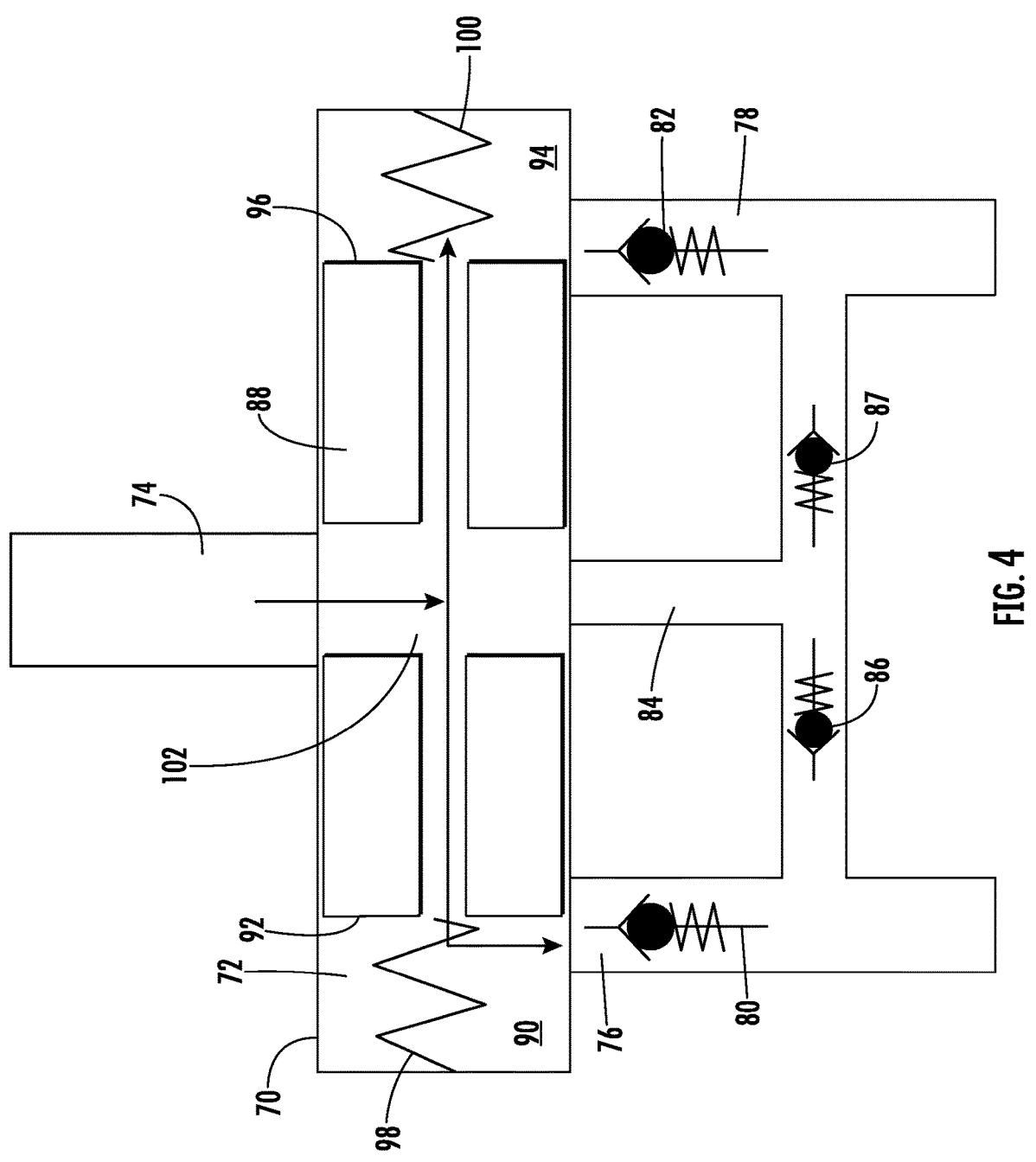
FIG. 4 is a passive flow control device of a multi-actuation system in neutral position when the flow rate of the actuators is equal according to an embodiment.

When a flow within the actuation assembly 42 is moving in a first direction, to balance the pressure between the plurality of actuators 48*a,* 48*b* fluidly connected to the control valve 46, a flow control device 62 may be arranged upstream from the inlet 56*a,* 56*b* of the actuators 48*a,* 48*b,* along the normal flow path of the hydraulic fluid provided to the actuators during operation. As shown, the flow control device 62 may be arranged within the plumbing 54 fluidly connecting the control valve 46 to the actuators 48*a,* 48*b.* In an embodiment, the flow control device 62 is positioned where the plumbing 54 splits into a first branch associated with the first actuator 48*a* and a second branch associated with the second actuator 48*b.* Alternatively, or in addition, a flow control device 62 may be used to balance the pressure between the plurality of actuators fluidly connected to the control valve 46 when the flow through the actuation assembly 42 is moving in a second, opposite direction. In such embodiments, a flow control device 62 may be arranged within the plumbing 58, such as where the first branch associated with the first actuator 48*a* meets the second branch associated with the second actuator 48*b.* The schematic diagram of FIG. 4 is similar to that shown in FIG. 3, but has different circuiting between the control valve 46, the actuators 48*a,* 48*b,* and the flow control devices 62. For example, the flow output from an outlet of the actuators 48*a,* 48*b* is not configured to flow through the movable valve body of the flow control device.

An example of a flow control device 62 is illustrated in more detail in FIG. 4. In an embodiment, the flow control device 62 is a passive device. As shown the flow control device 62 includes a housing 70 having a generally hollow interior 72. An inlet 74 of the flow control device 62 is fluidly connected to the control valve 46 such as via the plumbing 54. Similarly, a first outlet 76 extends from the housing 70 and a second outlet 78 extends from the housing 70. The first outlet 76 may be associated with the first actuator 48*a,* such as via the first branch of the plumbing 54 for example, and the second outlet 78 may be associated with the second actuator 48*b,* such as via a second branch of the plumbing 54 for example. In an embodiment, a first check valve 80 may be associated with the first outlet 76 to block a backwards flow into the housing 70 via the first outlet 76. Alternatively, or in addition, a second check valve 82 may be arranged within the second outlet 78 to block a backwards flow into the housing 70 via the second outlet 78.

In an embodiment, the housing 70 additionally includes a secondary inlet 84 configured to receive a flow of hydraulic fluid in the event that the direction of flow within the actuation assembly 42 is reversed. In such embodiments, a third check valve 86 and a fourth check valve 87 may be associated with the secondary inlet 84. The orientation of the third check valve 86 and the fourth check valve 87 may be opposite that of the first and second check valves 80, 82. As shown, the third check valve 86 is operable to block a flow of fluid within the first outlet 76 from mixing with the flow of the second outlet 78, and the fourth check valve 87 is operable to block a flow of fluid within the second outlet 78 from mixing with the flow of the first outlet 76. Alternatively, or in addition, the third and fourth check valves 86 may be operable to block a flow from the housing 70 out the secondary inlet 84 during normal operation or forward flow.

A movable valve body 88 is arranged within the interior 72 of the housing 70. The movable valve body 88 is smaller than the interior of the housing 70 relative to an axis of movement of the valve body 88 such that a first compartment 90 is formed between the housing 70 and a first end 92 of the valve body and a second compartment 94 is formed between the housing 70 and a second end 96 of the valve body. The first compartment 90 is fluidly connected, for example directly fluidly connected, to the first outlet 76 and the second compartment 94 is fluidly connected, for example directly fluidly connected, to the second outlet 78.

At least one biasing member, such as a coil spring for example, may be operable to bias the valve body 88 toward a neutral position. For example, a first biasing member 98 may extend between a portion of the housing 70 and the first end 92 of the valve body 88. The first biasing member 98 may be operable to bias the valve body 88 in a first direction toward a central or neutral position, as shown in FIG. 4. Similarly, a second biasing member 100 may be arranged between the housing 70 and a second, opposite end 96 of the body 88. The second biasing member may be operable to bias the valve body 88 in a second direction toward a central or neutral position. The valve body 88 may be sized such that when the valve body 88 is in the neutral position, at least a portion of both the first outlet 76 and the second outlet 78 is open and fluidly connected to the inlet 74. Further, when the valve body 88 is in the neutral position, the flow rate of the hydraulic fluid provided to the first actuator 48*a* via the first outlet 76, i.e., the first flow rate, and the flow rate of the hydraulic fluid provided to the second actuator 48*b* via the second outlet 78, i.e., the second flow rate, is equal. The valve body 88 may also be sized such that when opposing a biasing force of one of the first biasing members 98 and the second biasing member 100, the valve body 88 is positionable to completely block the flow to either of the first outlet 76 or the second outlet 78, respectively.

In the illustrated non-limiting embodiment, a fluid flow path 102 extends through the valve body 88. As shown, the fluid flow path 102 may extend from the inlet 74 to the first end 92 and the second end 96 of the movable body. In embodiments of the flow control device 62 including a secondary inlet 84, the valve body may additionally include a flow path extending between and fluidly connecting the secondary inlet 84 and the inlet 74.

The flow control device 62 is operable to regulate the flow rates of the hydraulic fluid provided to the first actuator 48*a* and the second actuator 48*b.* The flow rate of the hydraulic fluid provided to the first outlet 76 will generate a first pressure within the first compartment 90 of the housing 70. Similarly, the flow rate of the hydraulic fluid provided to the second outlet 78 will generate a second pressure within the second compartment 94 of the housing 70. These pressures are applied to the first end 92 and the second end 96 of the movable body, respectively. When the flow rates at the first actuator 48*a* and the second actuator 48*b* are equal, the pressures acting on both ends 92, 96 of the valve body are also equal. As a result, the valve body 88 remains in the central or neutral position.

Figure 5:
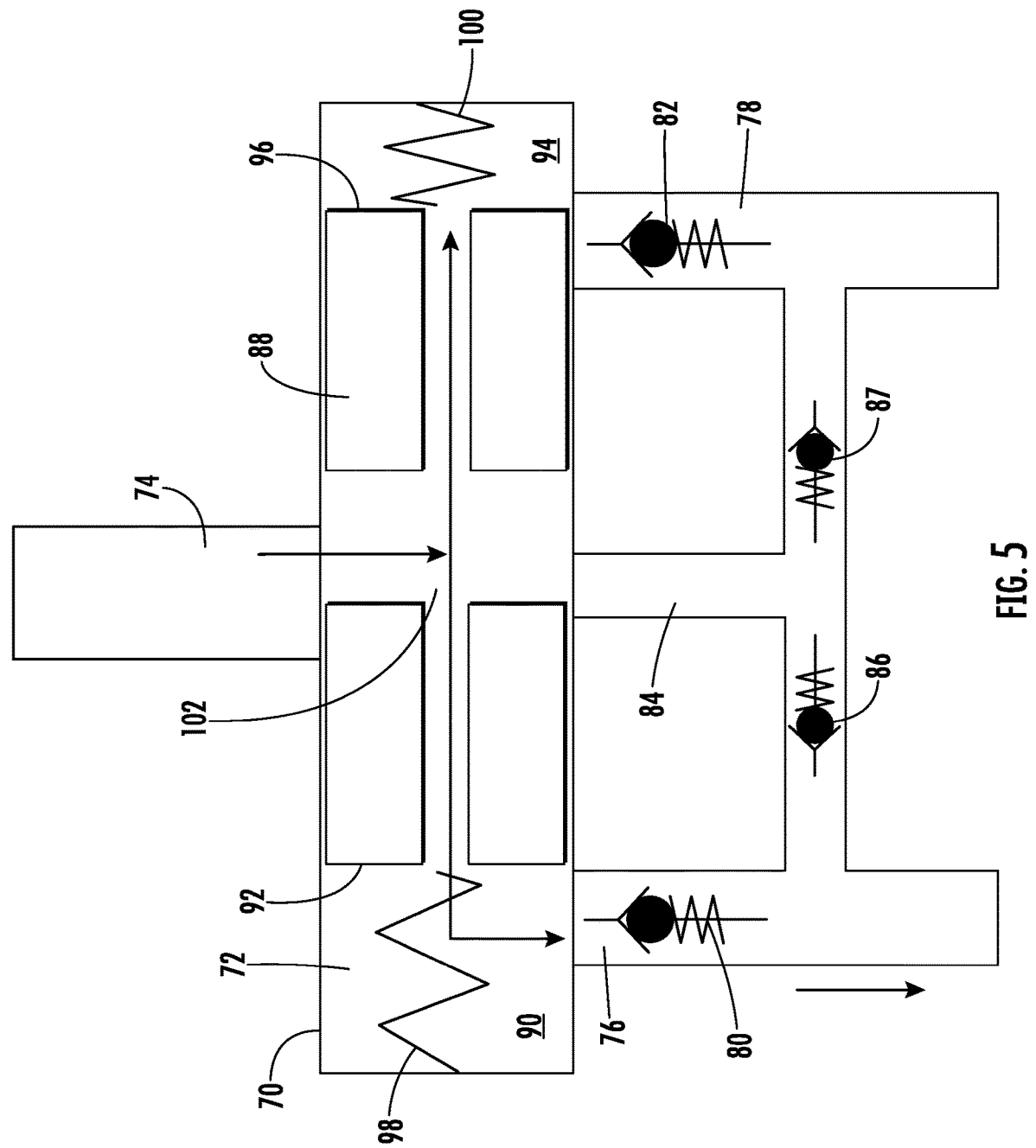
FIG. 5 is a passive flow control device of a multi-actuation system in when the flow rate of the actuators is imbalanced according to an embodiment.

With reference now to FIG. 5, the flow rate of the hydraulic fluid provided to the first actuator 48*a* may be less than the flow rate of the hydraulic fluid provided to the second actuator 48*b.* As shown, the pressure differential generated within the first compartment 90 and the second compartment 94 of the housing 70 as a function of these flow rates will cause the valve body 88 to move within the housing 70. As shown, the valve body is configured to move toward the outlet associated with the higher flow rate, in this instance, the second outlet 78. This movement of the valve body 88 opposes the second biasing member 100 and reduces the size of the second outlet 78 in fluid communication with the second compartment 94, while increasing the size of the first outlet 76 fluidly connected to the first compartment 90. Accordingly, the flow rate of the hydraulic fluid provided to the second outlet 78 from the second compartment 94 will reduce in response to the movement of the valve body 88. The flow rate of the hydraulic fluid provided to the first actuator 48a will increase by the same amount that the flow rate provided to the second actuator 48b is decreased.

The overall movement of the valve body 88 from the neutral position toward the first outlet 76 or the second outlet 78 will depend on the magnitude of the imbalance between the flow rates at the respective actuators. The valve body 88 may move a small amount, such that the flow to one of the outlets 76, 78 is only partially reduced, and the flow at the other outlet is slightly increased. However, in some embodiments, the valve body 88 may move to completely cover one of the outlets, such that the entire flow from the control valve 46 is provided to the other of the outlets.

It should be appreciated that although the passive flow control device is illustrated and described herein with respect to an actuation system 40 of an engine, the flow control device 62 may be suitable for any application having a plurality of actuators fluidly connected in parallel to the same source. An actuator assembly 42 including at least one flow control device 62 may be adapted to move the one or more control surface of an aircraft, such as the flaps for example.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. An actuation assembly comprising
   a control valve;
   a first actuator fluidly connected to the control valve via plumbing and a second actuator fluidly connected to the control valve via the plumbing, the first actuator having a first extend port and the second actuator having a second extend port; and
a flow control device operable to balance a flow rate of a fluid at the first actuator with the flow rate of the fluid at the second actuator, the flow control device being arranged within the plumbing between the control valve and the first extend port and the second extend port, the flow control device including:
   a housing having an inlet, a first outlet, a second outlet, and a hollow interior, the inlet being connectable to the plumbing, the first outlet being connectable to the first extend port, and the second outlet being connectable to the second extend port;
   a valve body arranged within the hollow interior, the valve body being movable within the hollow interior in response to a pressure within the housing, the pressure being associated with the first actuator and the second actuator;
   a first compartment formed within the hollow interior between the housing and a first end of the valve body, the first compartment being fluidly connected to the inlet and the first outlet; and
   a second compartment formed within the hollow interior between the housing and a second end of the valve body, the second compartment being fluidly connected to the inlet and the second outlet.

2. The actuation assembly of claim 1, wherein the first actuator includes a first retract port and the second actuator includes a second retract port, both the first retract port and the second retract port being fluidly connected to the control valve.

3. The actuation assembly of claim 1, wherein all fluid from the control valve is provided to both the first actuator and the second actuator through the flow control device.

4. The actuation assembly of claim 1, wherein the flow control device further comprises at least one biasing member operable to bias the valve body to a neutral position.

5. The actuation assembly of claim 1, wherein a flow path is formed in the valve body, the flow path connecting the inlet to the first compartment and connecting the inlet to the second compartment.

6. The actuation assembly of claim 1, wherein the valve body is movable within the housing to adjust the flow rate of the fluid at both the first outlet and the second outlet.

7. The actuation assembly of claim 1, wherein the first actuator and the second actuator are substantially identical.

8. The actuation assembly of claim 1, wherein each of the first actuator and the second actuator includes a movable piston.

9. The actuation assembly of claim 1, wherein the first actuator and the second actuator are part of a gas turbine engine.

10. The actuation assembly of claim 1, wherein the first actuator and the second actuator are operably coupled to a control surface.

11. A method of balancing a flow rate between a plurality of actuators within an actuation assembly, the method comprising:
   providing a flow control device having a housing including an inlet, a first outlet connectable to a first extend port of a first actuator, a second outlet connectable to a second extend port of a second actuator, and a valve body movable within the housing in response to a pressure associated with the first actuator and the second actuator, a first compartment being formed between the housing and a first end of the valve body and fluidly connected to the inlet and the first outlet and a second compartment formed between the housing and a second end of the valve body fluidly connected to the inlet and the second outlet;

providing a fluid at a first flow rate to the first extend port;

generating a first pressure within the first compartment of the flow control device based on the first flow rate;

providing the fluid at a second flow rate to the second extend port;

generating a second pressure within the second compartment of the flow control device based on the second flow rate; and moving the valve body of the flow control device in response to the first pressure and the second pressure to balance the first flow rate and the second flow rate.

12. The method of claim 11, wherein when the first flow rate is less than the second flow rate, moving the valve body includes moving the valve body away from a first outlet fluidly connected to the first actuator and towards a second outlet fluidly connected to the second actuator.

13. The method of claim 12, further comprising decreasing a size of the second outlet fluidly connected to the second actuator and increasing the size of the first outlet fluidly connected to the first actuator in response to moving the valve body towards the second outlet.

14. The method of claim 12, further comprising increasing the first flow rate and decreasing the second flow rate in response to moving the valve body towards the second outlet.

15. The method of claim 11, wherein the fluid provided at the first flow rate to the first extend port is output from a first outlet of the flow control device and the fluid provided at the second flow rate to the second extend port is output from a second outlet of the flow control device.

16. The method of claim 11, further comprising moving the valve body to a neutral position when the first flow rate is equal to the second flow rate.

17. The method of claim 11, further comprising biasing the valve body toward a neutral position.

18. The method of claim 11, further comprising adjusting a control surface operably coupled to both the first actuator and the second actuator.

* * * * *